United States Patent [19]

Rabatin

[11] 4,099,089
[45] Jul. 4, 1978

[54] FLUORESCENT LAMP UTILIZING TERBIUM-ACTIVATED RARE EARTH OXYHALIDE PHOSPHOR MATERIAL

[75] Inventor: Jacob G. Rabatin, Chardon, Ohio

[73] Assignee: General Electric Company, Schenectady, N.Y.

[21] Appl. No.: 749,925

[22] Filed: Dec. 13, 1976

[51] Int. Cl.² .............................................. H01J 61/44
[52] U.S. Cl. ............................... 313/487; 252/301.4 H
[58] Field of Search .............................. 313/486, 487; 252/301.4 H, 301.4 R

[56] References Cited

U.S. PATENT DOCUMENTS

| 3,521,120 | 7/1970 | Anderson | 313/201 X |
| 3,548,238 | 12/1970 | Chenot et al. | 313/486 |
| 3,617,743 | 11/1971 | Rabatin et al. | 313/467 X |
| 3,858,082 | 12/1974 | Thornton, Jr. | 313/487 |
| 3,875,453 | 4/1975 | Thornton, Jr. | 313/487 |

Primary Examiner—Palmer C. Demeo
Attorney, Agent, or Firm—John F. McDevitt; Lawrence R. Kempton; Frank L. Neuhauser

[57] ABSTRACT

Use of terbium-activated rare earth oxyhalide phosphor material in a high-loaded fluorescent lamp having an operating temperature range of approximately 100° C or greater provides high efficiency emission. The phosphor material can be utilized alone or in combination with other suitable phosphor materials at the elevated operating temperatures to generate white-light composite emission. For white-light emission, the phosphor admixture further includes a narrow band red-emitting phosphor along with a narrow band blue-emitting phosphor in suitable portions.

6 Claims, 2 Drawing Figures

FLUORESCENT LAMP UTILIZING TERBIUM-ACTIVATED RARE EARTH OXYHALIDE PHOSPHOR MATERIAL

BACKGROUND OF THE PRESENT INVENTION

Terbium-activated lanthanum and gadolinium oxyhalide luminescent materials are generally disclosed in U.S. Pat. No. 3,617,743 which includes mention of utilizing said phosphors in a high-pressure mercury lamp. Specifically, a particular phosphor composition containing cerium ion at activator levels was found to emit efficiently under 3650 Angstrom radiation and provide favorable light output maintenance at elevated temperatures.

Fluorescent lamps having an operating temperature range of approximately 100° C and higher are also known, and one such type electrodeless fluorescent lamp is disclosed in U.S. Pat. Nos. 3,500,118 and 3,521,120. Such fluorescent lamps utilize an ionizing energy source providing radio frequency energy to ionize the gas atmosphere contained in a light transmitting envelope. The lamp envelope is also coated on the inner surface with a phosphor coating as the principal means of visible light generation. Conventional type fluorescent lamps wherein the light transmitting envelope is tubular shaped and contains a pair of spaced apart electrodes in each end of the lamp envelope which ionizes a gas filling of mercury and rare gas are also highly loaded and operate at temperatures of 100° C or greater.

It is also known to generate white light in a fluorescent lamp with a phosphor coating comprising a plurality of different phosphor materials wherein each of the phosphor constituents is a sharp line or narrow band emitter having a predominant portion of the emission lying in a relatively narrow region of about 80 nm. These narrow band emitting phosphors are distinguished from wide or broad band emitters wherein the visible emission is so broad that there is no 80 nm. wavelength range where the visible emission is predominantly located. Such known phosphor combinations can be in the form of an admixture employing a narrow band red-emitting phosphor with a narrow band green-emitting phosphor and a narrow band blue-emitting phosphor with the proportions being fixed to generate composite white-light emission.

The predictability of a given phosphor material to produce light emission in a given environment is uncertain. Such unpredictability is especially evident in phosphor combinations being used at elevated temperatures. Maintenance is a critical problem at elevated operating temperatures by reason of additional mercury deposition which occurs and renders efficiency of suitable phosphors as highly speculative. Consequently, suitable phosphors are still being sought for use in fluorescent lamps operating at elevated temperatures which will generate light efficiently and maintain lumen levels comparable to fluorescent lamps being operated at lower temperatures.

SUMMARY OF THE INVENTION

It has now been found, surprisingly, that certain oxyhalides of lanthanum or gadolinium activated with terbium continue to provide efficient visible emission in a highly-loaded fluorescent lamp environment at operating temperatures of approximately 100° C or higher. Accordingly, it is an object of the present invention to provide an improved fluorescent lamp phosphor for use in an elevated operating temperature environment either alone or in combination with other suitable phosphors. Specifically, the present phosphor material being utilized in this manner has the general formula:

$$LnOx:Tb^{3+}$$

wherein Ln is one or more of La or Gd, $x$ is one or more of Cl, Br and I, and

Tb is present in activator concentrations from about 0.01 mole to about 0.3 mole per mole of phosphor. In a preferred embodiment, the phosphor coating comprises a combination of different phosphor compositions which can be in the form of an admixture. Such phosphor admixture further contains a narrow band red-emitting phosphor and a narrow band blue-emitting phosphor in proper proportions to generate white-light efficiently.

Satisfactory phosphors of the present invention can be made by either of at least two processes as disclosed in U.S. Pat. Nos. 3,591,516 and 3,607,770. For either process, it is desirable to start with rare earth oxides coprecipitated with the activator ion. As is described in the aforementioned patents, the oxide mixture can thereafter be blended with ammonium bromide and the blended mixture then fired to form the activated phosphor composition which can then be recrystallized with an alkaline metal halide to form the well-crystallized luminescent material of the invention.

BRIEF DESCRIPTION OF THE DRAWINGS

Embodiments of the invention will now be described with reference to the accompanying drawings in which.

DESCRIPTION OF THE PREFERRED EMBODIMENTS

The spectral energy distribution of LaOBr activated with at least 0.02 mole terbium under 2537 Angstrom excitation is found in four groups of narrow bands peaking at 485, 542, 585, and 624 nm. wavelength. At terbium activator concentrations less than about 0.03 mole per mole of phosphor, the emissions also contain significant emission peaks at 385, 418, 440 and 460 nm. wavelength. The spectral emission of LaOBr: 0.10Tb under 2537 Angstrom excitation occurs predominantly in the narrow 540–560 nm. wavelength region at the quantum output reported in Table I on the following page.

Table I

| Emission Bands | Relative % Quanta |
|---|---|
| 485 nm. | 17.4 |
| 542 | 56.4 |
| 585 | 14.6 |
| 624 | 11.6 |

The lumen efficiency of 40 watt size conventional tubular fluorescent lamps utilizing terbium ion concentrations in the range above given is shown in Table II below. As can be noted from the chromaticity values reported in said Table II, the emission color becomes more green-yellow as the terbium concentration is increased.

Table II

| Terbium Conc. | Lumens | x | y |
|---|---|---|---|
| .02 | 3800 | .305 | .444 |
| .05 | 4490 | .325 | .492 |
| .05 | 4419 | .328 | .499 |
| .05 | 4500 | .329 | .500 |

The lumen values in the above table are reported at 0 hours operation and serve to illustrate the relative greater lumen efficiency obtained with the present phosphor material in fluorescent lamps compared with many conventional phosphor materials.

Figure 1:
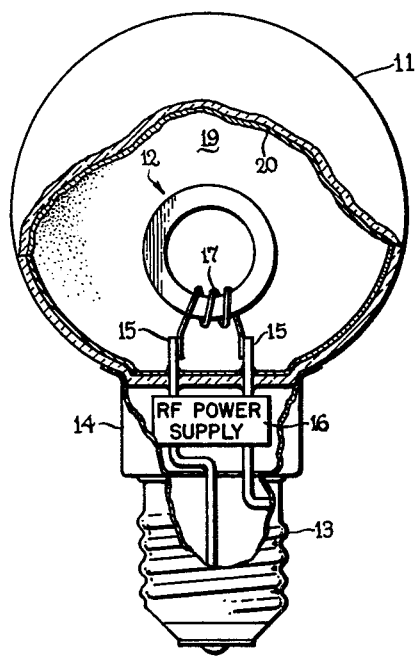
FIG. 1 is a front sectional view of an induction ionized fluorescent lamp in accordance with the present invention.

Referring to FIG. 1, there is shown a sectional view of an electrodeless fluorescent lamp having an induction transformer core wholly contained within an ionizable gas. A light transmissive, evacuable envelope 11 is mounted on a base assembly 14 which supports a lamp base plug 13. A radio frequency power supply 16 contained within the base assembly causes current flow through metal rods 15 and a primary winding 17 which excites a radio frequency magnetic field in a toroidal transformer core 12 which is contained within said light transmissive envelope 11. The radio frequency power supply 16 may be of any type known to the art. For example, the inverter circuit which is described in aforementioned U.S. Pat. No. 3,521,120 would be suitable for use with lamps operating in its power range. The space within the envelope contains an ionizable gas 19 which links the transformer core. The radio frequency magnetic field within the transformer core 12 induces an electric field which ionizes and excites the gas 19. Upon excitation the gas emits 2537 Angstrom radiation in the ultraviolet region. The internal surface of the envelope 11, and, if desired, the external surfaces of the transformer core 12 are coated with the phosphor material 20 of the present invention. The gaseous medium 19 in lamps of this type is typically a mixture of rare gas (for example, krypton and/or argon) and mercury vapor and/or cadmium vapor at a pressure between approximately 0.2 and approximately 3.0 torr when measured at room temperature.

Figure 2:
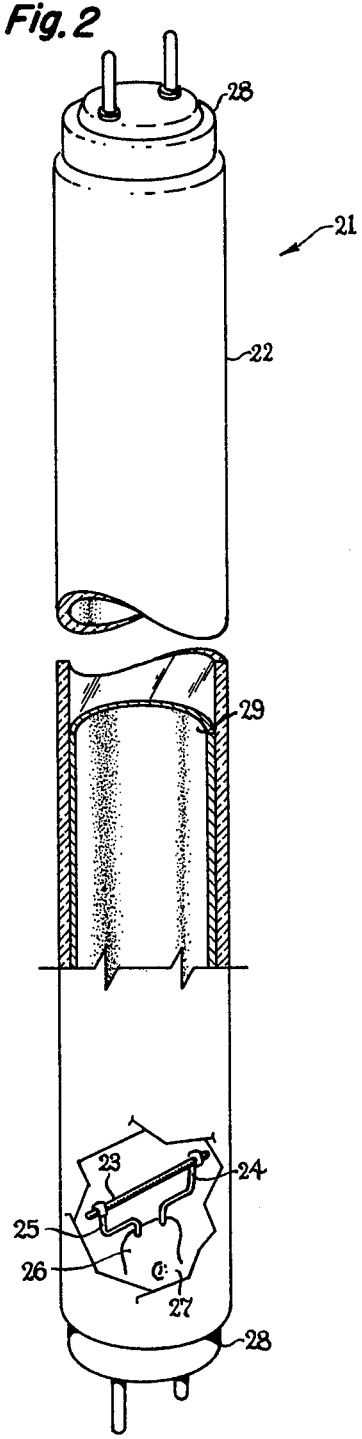
FIG. 2 is a perspective view partially broken away of a low pressure fluorescent lamp of the present invention.

In FIG. 2 there is depicted a low pressure type fluorescent lamp 21 having an elongated soda-lime silicate glass bulb 22 with a circular cross section. The discharge assembly in said lamp has the usual electrode structure 23 at each end supported by in-lead wires 24 and 25 which extend through a glass press seal 26 in a mount stem 27 to the contacts of a base 28 affixed at opposite ends of the lamp. The discharge sustaining filling in the sealed glass tube is an inert gas such as argon or a mixture of argon and other gases at a low pressure in combination with a small quantity of mercury to generate the 2537 Angstrom radiation characteristic of this type lamp operation. The inner surface of the glass bulb is provided with a coating 29 utilizing the phosphor material of the present invention.

It will be apparent from the foregoing description that a generally useful improved phosphor composition has been disclosed for highly loaded fluorescent lamps operating at temperatures of approximately 100° C or greater. It should be appreciated from the foregoing description that luminescent materials of the present invention can be prepared having a slightly modified composition than above specifically disclosed without sacrificing the desired performance advantages. For example, minor substitution of fluoride ion for chloride or bromide ion in said phosphor material should not materially lower the advantages found. It is intended to limit the present invention, therefore, only by the scope of the following claims.

What I claim as new and desire to secure by Letters Patent of the United States is:

1. In a high-loaded low-pressure type fluorescent lamp construction having an operating temperature range of approximately 100° C or greater which comprises a light transmitting envelope containing an ionizing energy source, an ionizable gas atmosphere generating 2537 Angstrom radiation and a phosphor coating deposited on the inner surface of said light transmitting envelope, the improvement whereby said phosphor coating comprises a phosphor composition having the general formula:

$$LnO_x:Tb^{3+}$$

wherein
Ln is one or more of La and Gd,
x is one or more of Cl, Br and I, and
Tb is present as the sole activator element in activator concentrations from about .001 mole to about 0.3 mole per mole of phosphor, said phosphor exhibiting greater lumen efficiency at chromaticity values for the x coordinate in the range from about 0.305 to about 0.329 and for the y coordinate with the range from about 0.444 to about 0.500.

2. a fluorescent lamp as in claim 1 wherein the phosphor coating comprises a combination of different phosphor compositions.

3. A fluorescent lamp as in claim 1 wherein the phosphor coating comprises an admixture of different phosphor compositions.

4. A fluorescent lamp as in claim 3 wherein the phosphor admixture further contains a narrow band red-emitting phosphor and a narrow band blue-emitting phosphor in preselected proportions to generate white-light composite emission.

5. A fluorescent lamp as in claim 1 wherein the ionizing energy source provides radio frequency energy and the ionizable gas atmosphere includes mercury and a rare gas.

6. A fluorescent lamp as in claim 1 wherein the light transmitting envelope is tubular shaped and contains a pair of spaced apart electrodes at each end along with a filling of an ionizable gas atmosphere which includes mercury and a rare gas.

* * * * *